Feb. 18, 1969

E. P. SLAY 3,428,098

MEANS FOR TRANSFERRING BULK SUBSTANCES FROM
ONE CONTAINER TO ANOTHER

Filed Feb. 17, 1966

Inventor
EUGENE P. SLAY

By Charles B. Haverstock
Attorney

United States Patent Office 3,428,098
Patented Feb. 18, 1969

3,428,098
MEANS FOR TRANSFERRING BULK SUBSTANCES FROM ONE CONTAINER TO ANOTHER
Eugene P. Slay, St. Louis, Mo., assignor to Slay Transportation Company, Incorporated, St. Louis, Mo., a corporation of Missouri
Filed Feb. 17, 1966, Ser. No. 528,257
U.S. Cl. 141—67          11 Claims
Int. Cl. B65b 3/14, 1/16

ABSTRACT OF THE DISCLOSURE

An apparatus to facilitate the filling of containers such as storage drums from larger bulk storage devices such as tank trucks, tank cars, tankers, and other like devices and to make the receipt, handling and storage of bulk shipments easier and more convenient and to permit the ordering in larger quantities with the resultant saving even by those having relatively limited storage facilities for materials in bulk form. The present apparatus includes means by which bulk substances such as substances in powder and granular form shipped or contained in large storage devices can be quickly and efficiently transferred to more manageable containers such as storage drums.

---

The present invention relates generally to means for transferring bulk substances and particularly substances in powder and granular form from one container to another and more particularly to a device for transferring such substances from tank trucks and other bulk storage devices to smaller containers such as storage drums and the like.

There has for a long time been a need for inexpensive easy to operate means for transferring substances, such as powders and the like, from bulk storage containers, such as tank trucks, to smaller and more easily manageable containers such as storage drums. Furthermore, many businesses are not equipped to receive and handle large quantities of substances such as car load and truck load quantities and as a result have had to buy in smaller quantities and pay a premium price for doing so. All known means for transfering substances such as bulk quantities of powder and granular substances have also been relatively wasteful and messy and have been difficult and time consuming to operate. It has also been impractical in many situations to transfer bulk materials from large containers directly into relatively small easy to handle storage drums. The present invention overcomes these and other disadvantages and shortcomings of known material transfer means.

The subject device comprises a conduit having a fitting on one end for connecting to an outlet fixture on a tank truck or other bulk storage device and means on the other end including a wall member for positioning on or attaching to the open upper end of a container such as a storage drum, said wall member having a first opening therethrough in communication with the conduit, and a second opening therethrough communicating with an expandible dust bag, said wall member including means whereby the inside of the drum can be observed while material is being fed thereto through the conduit.

A principal object of the present invention is to provide relatively inexpensive means for transferring substances from one storage container to another.

Another object is to reduce or eliminate waste when transferring substances from one container to another.

Another object is to provide material transfer means which can be operated by persons having relatively little skill and training.

Another object is to enable businesses having limited storage facilities to be able to receive and handle car load shipments of bulk materials.

Another object is to provide convenient means for receiving and handling materials received in car load or tank truck load quantities.

Another object is to make the transfer from one container to another of substances less messy.

Figure 2:
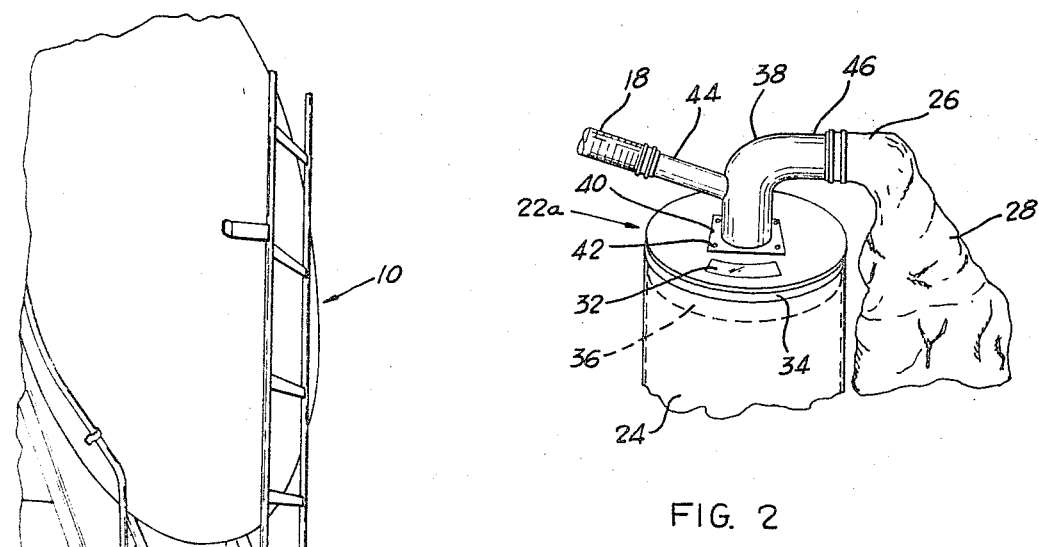
Figure 1:
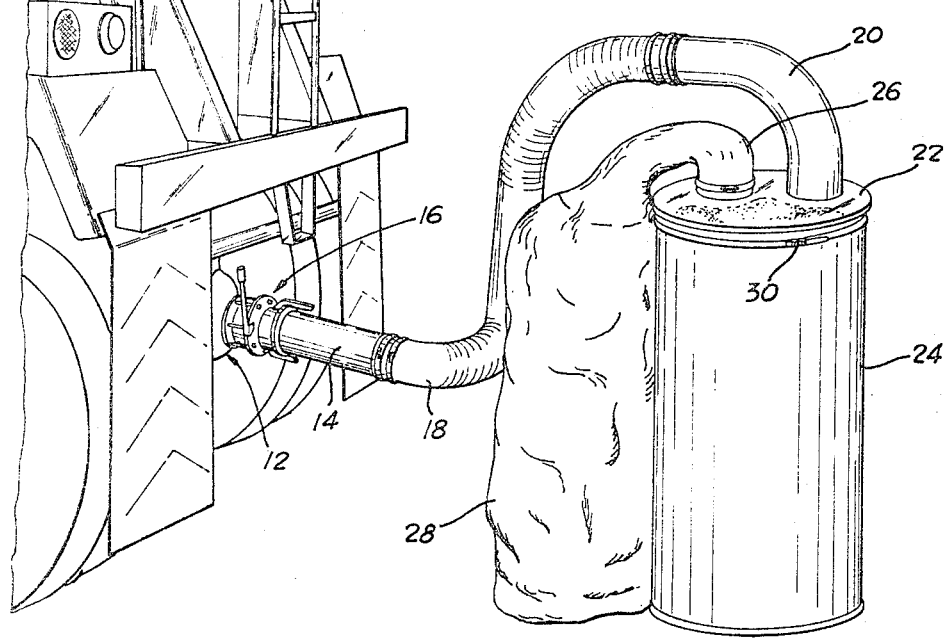

These and other objects and advantages of the present invention will become apparent after considering the following detailed specification which discloses a preferred embodiment of the subject device in conjunction with the accompanying drawing, wherein:

FIG. 1 is a perspective view showing the subject device being used to transfer material from a tank truck to a storage drum; and, FIG. 2 is a perspective view showing a modified form of the subject device.

Referring to the drawing more particularly by reference numbers, number 10 indicates a tank truck such as are used to transport bulk materials from one location to another. For purposes of the present invention, the truck 10 is assumed to be used to transport substances in granular or powdered form. The truck 10 has outlet means 12 through which the substance contained therein is forced out. The outlet means 12 may include a blower, an auger or other means to force feed the substances contained therein.

The outlet means 12 are connected to one end of a conduit 14 by means of a coupling assembly 16. The opposite end of the conduit 14 is connected by a suitable connector to one end of a flexible conduit 18 which has its opposite end connected to one end of a tubular member 20. The tube 20 is formed into a right angle bend and its opposite end is connected by suitable means to a cover member 22. During operation of the subject means, the cover member 22 is placed on or attached to the upper open end of a drum 24 to be filled. The cover 22 has one opening which communicates the tubular member 20 with the inside of the drum and a second opening connected by suitable means such as an upwardly extending flange and clamping rings to a neck 26 of a dust collecting bag 28. The bag 28 may be similar to a vacuum cleaner bag, and is included to catch the dust and overflow that accumulates during transfer of material from the truck to the drum.

When material is fed through the tubes 14, 18 and 20 and into the drum 24 it creates pressure in the drum 24 which causes the bag 28 to inflate as shown in the drawing. This enables communication between the inside of the drum and the inside of the bag and relieves the pressure in the drum. It also provides means for accumulating airborne particles and overflow and prevents waste.

In the preferred form of the subject device the cover 22 is constructed of a transparent material such as Plexiglas so that the operator can observe the inside of the drum 24 as it is filling and can cantrol the feed means thereto. It is usually also desirable to have the drum being filled located fairly near to the tank truck 10 so that the feed controls are handy to the operator. As already noted, the cover 22 may be constructed to be clamped to the drum during filling by suitable means such as clamping ring 30. The cover 22 may also be held in place by the operator or it can be weighted down by suitable means. The cover can also be made to fit standard size drums or it can be made large enough to cover all drum sizes within a particular range.

FIG. 2 shows an optional form of closure member or cover 22a with a peephole 32 having a transparent viewing window. The modified cover 22a is also provided with a gasket 34 of foam or other resilient material which sealably engages the upper edge of a drum on which it is positioned. The gasket 34 can cover substantially the whole surface of the cover 22a or it can be annular to cover only a selected portion of the cover. It is also contemplated to attach an annular depending flange to the cover such as flange 36 which is of a size to extend down into the drum or other container to hold the cover 22a in place during filling.

A tubular housing 38 is attached to the cover 22a by means of an integral mounting plate 40 and fasteners 42. The housing 38 has an inlet tubular portion 44 which is connected to a feed tube such as the flexible tube 18 in FIG. 1. The housing 38 also has a larger second tubular portion or elbow 46 which is connected to the neck portion 26 of the dust bag 28. Operation of the modified construction in FIG. 2 is similar to the operation of the device shown in FIG. 1.

There has thus been shown and described novel means for transferring materials such as granular and powder materials from one container or storage device to another, which means fulfill all of the objects and advantages sought therefor. Many changes, modifications, variations and other uses and applications of the present device will, however, become apparent to those skilled in the art after considering this specification. All such changes, modifications, variations, and other uses and applications which do not depart from the spirit and scope of the invention are deemed to be covered by the invention which is limited only by the claims which follow.

What is claimed is:

1. Means for transferring materials from a bulk container having outlet means including means for feeding material therefrom to a second container such as a storage drum having an opening at one end that can be closed by a closure member comprising a wall member of a size and shape to be used to temporarily cover an opening into the second container to be filled from the first container, said wall member having first and second openings therethrough, a tubular member having means on one end adapted to connect to the outlet means of the bulk container, and means connecting the opposite end to the wall member in communication with the said first opening, an inflatable bag connected to the wall member in communication with the said second opening.

2. The means defined in claim 1 wherein a portion of said wall member is constructed of a transparent material so that the inside of the second container is visible therethrough during filling.

3. The means defined in claim 1 including means for attaching the wall member to the second container.

4. The means defined in claim 1 wherein at least a portion of the tubular member is flexible.

5. Means for transferring materials from a bulk storage container such as a tank truck or the like having outlet means for feeding material therefrom to a second container such as a storage drum having an opening at one end that can be closed by a closure member comprising a wall member of a size and shape to engage and substantially close the opening in the second container, said wall member having first and second openings therethrough, a tubular member having one end with a fitting thereon for cooperating with the outlet means on the bulk storage container, means on the opposite end of the tubular member for connection to the wall member in communication with the first opening therethrough, an inflatable bag, and means connecting the inflatable bag to the wall member in communication with the second opening.

6. The means defined in claim 5 including means for sealing between the wall member and the second container to be filled when the wall member is positioned in engagement therewith.

7. The means defined in claim 5 wherein the wall member is constructed of transparent material, and means for controlling movement of material through the tubular member.

8. Means for transferring materials from a first container having outlet means including means for feeding material therefrom to a second container having an opening therein, comprising a wall member of a size and shape to cover the opening into the second container, said wall member having a hole therethrough, means connecting the outlet means of the first container in communication with the hole through the wall member, said connecting means including a tubular member having a fitting on one end for connection to the outlet means on the first container, and means connecting the opposite end of said tubular member to the wall member in communication with the hole in the wall member, an inflatable member, and other means connecting said inflatable member in communication with the hole in the wall member.

9. The means for transferring materials defined in claim 8 wherein a housing member is attached to the wall member, said housing member having a first opening in communication with the hole through the wall member, a second opening in communication with the tubular member for communicating the outlet means on the first container with the opening in the wall member, and a third opening for communication with the inflatable member.

10. The means for transferring materials defined in claim 8 wherein a flange is attached to the wall member, said flange having a shape to cooperate with the opening in the second container when the wall member is positioned thereon.

11. The means for transferring materials defined in claim 8 including a resilient gasket attached to the wall member in position to engage the second container adjacent the opening therein to form a seal between the wall member and said second container.

References Cited

UNITED STATES PATENTS 1,972,026   8/1934   Miller _____ 141—68 X

FOREIGN PATENTS 411,082   3/1925   Germany.

OTHER REFERENCES

Heating and Ventilating; July 1953 Detail Sheet; pp. 9 and 10.

HOUSTON S. BELL, JR., *Primary Examiner.*

U.S. Cl. X.R.

141—285; 302—59